United States Patent [19]
Moraw et al.

[11] 4,441,945
[45] Apr. 10, 1984

[54] METHOD FOR SELECTIVE LAMINATION OF THERMOPLASTIC LAYERS

[75] Inventors: Roland Moraw; Renate Schädlich, both of Wiesbaden, Fed. Rep. of Germany

[73] Assignee: Hoechst Aktiengesellschaft, Frankfurt am Main, Fed. Rep. of Germany

[21] Appl. No.: 111,033

[22] Filed: Jan. 10, 1980

[30] Foreign Application Priority Data

Jan. 12, 1979 [DE] Fed. Rep. of Germany ....... 2900978

[51] Int. Cl.³ .......................... B60J 1/00; B32B 31/00
[52] U.S. Cl. ...................................... 156/108; 40/630; 156/219; 156/282; 156/289; 156/290; 156/306.6; 156/308.4; 283/107; 428/195; 428/203
[58] Field of Search ............. 156/108, 290, 219, 306.6, 156/282, 308.4, 289, 581, 583.4; 428/195, 203; 219/243; 93/DIG. 1; 283/7; 40/2.2

[56] References Cited
U.S. PATENT DOCUMENTS 2,343,117  2/1944  Vincent ............................. 156/308.4
2,698,273  12/1954  Miner et al. ........................ 156/282
2,749,640  6/1956  Scott .................................. 156/290
2,859,550  11/1958  Langan .............................. 156/108
3,258,386  6/1966  Blythe ............................... 156/583.4
3,386,503  6/1968  Corning et al. .................. 156/583.4
3,523,050  8/1970  Campbell ........................... 156/290
4,084,032  4/1978  Pasersky ............................. 40/2.2

FOREIGN PATENT DOCUMENTS 2223290  4/1973  Fed. Rep. of Germany ......... 40/2.2

Primary Examiner—John J. Gallagher
Attorney, Agent, or Firm—Schwartz, Jeffery, Schwaab, Mack, Blumenthal & Koch

[57] ABSTRACT

Disclosed is a method and apparatus to facilitate the method of discontinuously laminating at least two thermoplastic layers together. The layers are heated and pressed together over all but a selected window portion of the layers to facilitate lamination between the layers at all points except the selected window portions. Relief grid images can be embossed in the selected window portion or holograms or other difficult to forge inserts can be provided in these window areas prior to lamination. During lamination, the reduced or absence of heating in these window portions permits lamination of the card without destruction of the selected window portion insert.

4 Claims, 6 Drawing Figures

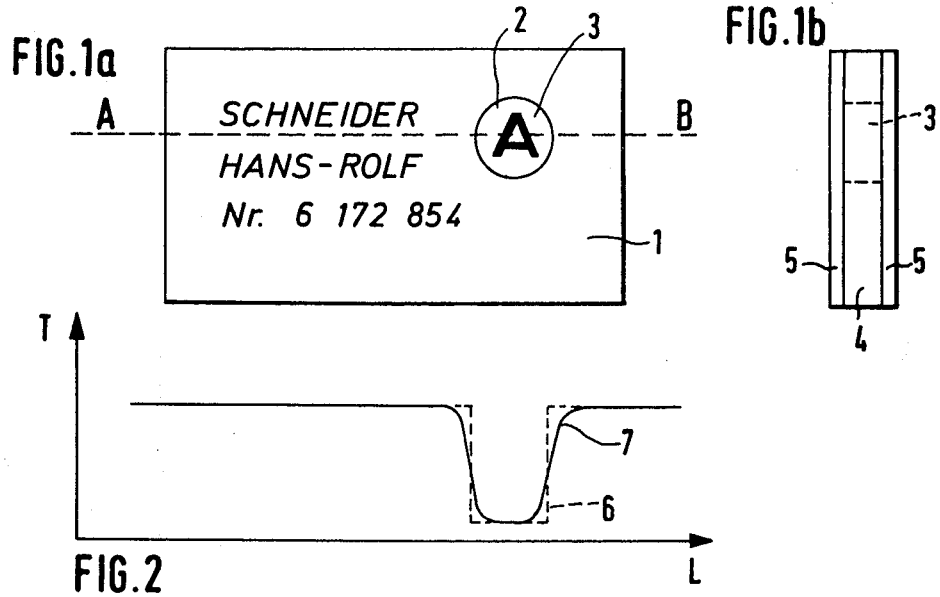
FIG.1a
FIG.1b
FIG.2
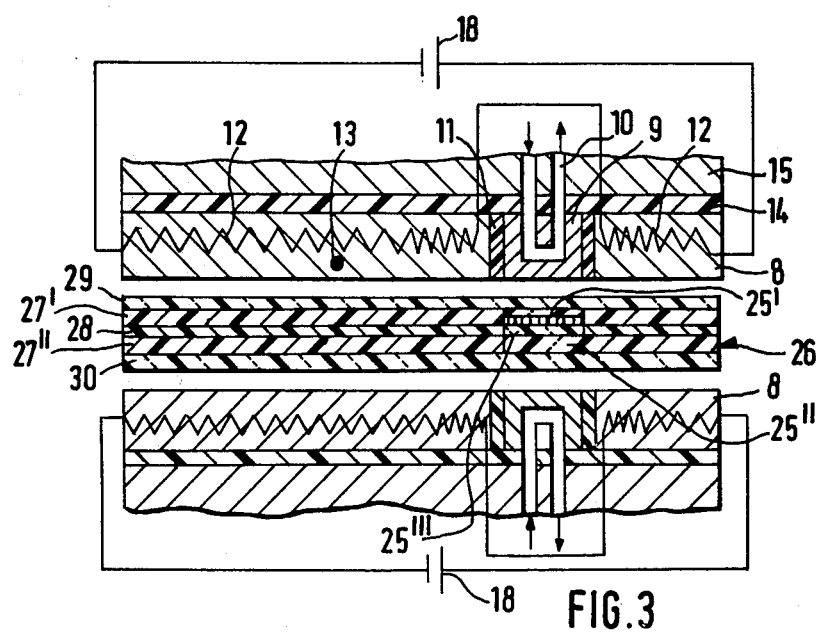
FIG.3

METHOD FOR SELECTIVE LAMINATION OF THERMOPLASTIC LAYERS

BACKGROUND OF THE INVENTION

The present invention relates generally to a process and an apparatus for laminating layers of partially thermoplastic films by action of heat and pressure on the layers.

Laminating thermoplastic film under pressure with the action of temperature on other films or other layers, for example paper, creates a firm bond. Along with other uses, this process is used for the preparation of identity cards which have a core layer which can have security prints, personal data, further information and details, and, if appropriate, an image of the cardholder, with the core layer laminated between transparent films for the protection against unauthorized alterations.

As far as identification cards, such as check cards, identity cards or passport cards, are concerned, a multiplicity of security features, such as guilloche prints or watermarks make an imitation more difficult and thus contribute to its avoidance. Security features such as microfilm images, holograms and relief grid images can be used for this purpose as well. These security features are generally inserted in a window hole in the card core and protected by the outer transparent films.

From West German Offenlegungsschrift No. 2,308,876 a plasticized identity card is known, which comprises a thicker, transparent film, a printed special paper of high quality and as far as the securing technology is concerned, which shows differences in thickness resulting from watermarks and/or additionally incorporated security features, and of a thinner transparent film. The thicker transparent film acts as supporting film and confers to the identity card the necessary stability and rigidity as well as the desired thickness. The supporting film can alternatively represent the front or the rear of the plasticized identity card. The thinner transparent film acts as a covering film and may alternatively compose the rear or the front of the identity card.

A photograph in the form of a film transparency can additionally be plasticized in this identity card. In this case the exposed, developed and fixed film transparency is alternatively inserted between the supporting film and the special paper or between the special paper and the covering film and is plasticized together with the films. In addition a signature field of a special paper can be incorporated in the identification card and be plasticized with it. In another embodiment of the identity card, no additional special paper strip is introduced as signature field but an opening in either the supporting film or covering film is left in the covering film during the plastification process and acts as signature field.

During the plastification or lamination process, high pressures and temperatures are required, which endanger the inserted images or holograms. A slight melting of the gelatin layer may occur which could lead, in a photographic information carrier, to image distortions which can end in illegibility of the stored data and information. Holograms are even more sensitive to layer displacement. Layers with relief images are endangered even to a greater extent than are photographic layers during this lamination process. These relief images are produced by exposing and developing photolacquer layers, by embossing thermoplastic films or in an electrophotographic process, by electrostatically charging, exposing and developing a photoconductive, thermoplastic recording layer until a relief image is formed.

To avoid melting of the security features certain precautions have been taken, including eg. embossing the films at temperatures which are as high as possible and are higher than the laminating temperature, crosslinking substances such as aromatic azides being added, thermally or photochemically, to the photoconductive, thermoplastic recording layers. However, these measures are in general insufficient for the image stabilization during the lamination process.

SUMMARY OF THE INVENTION

It is an object of this invention to provide a process and an apparatus for carrying the process out where pressure and temperature sensitive securing features such as grid images, microfilm images, holograms etc. can be laminated in a bond of films in such a way that the image remains stable, without any destruction of the information carried in the image.

The above and other objects are achieved in accordance with the present invention by the process of: aligning at least two thermoplastic layers; pressing the two thermoplastic layers together; and heating the external surfaces of the thermoplastic layers in a discontinuous manner across the surface, the discontinuous heating occurring at a selected window portion of the layers wherein the temperature at the window portion is at least 10° C. lower than the rest of the external surface of the layers.

The above and other objects are achieved through the use of a laminating apparatus which includes: first and second laminating plates; means for discontinuously heating the first and second laminating plates; and means for pressing the plates together with the thermoplastic layers to be laminated therebetween, with the discontinuous heating means heating the thermoplastic layers less at a window portion than elsewhere on the external surface of the layers.

BRIEF DESCRIPTION OF THE DRAWINGS

A more complete appreciation of the invention and the attendant advantages thereof will be more clearly understood by reference to the following drawings wherein:

FIG. 1a is a plan view of an identity card with a laminated relief grid;

FIG. 1b is a sectional side view of the identity card in FIG. 1a;

FIG. 2 is a graph showing the theoretical and actual temperature distributions along the card during lamination in accordance with the present invention;

FIG. 3 is a side view, partially in section, of a pressing apparatus for laminating, including two plates and layers for lamination situated therebetween;

DETAILED DESCRIPTION OF PREFERRED EMBODIMENTS

Figure 4:
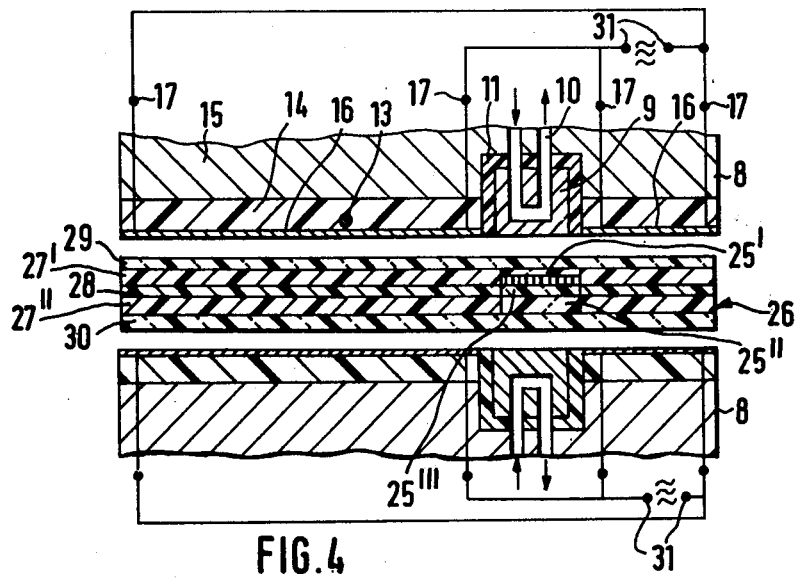
FIG. 4 is a side view, partially in section, of a modification of the FIG. 3 apparatus.

The problem of laminating identity cards with images was solved by the process, mentioned above, in such a way that the laminating temperature acting on the layers, is lowered by 10° to 70° C. in the window area compared to the remaining areas of the layers. Additionally, the pressure in the window area may be lowered, compared to the laminating pressure on the remaining surface of the layers which are to be laminated.

According to the development of the process, the laminating temperature is increased in a narrow area around the window area, compared to the laminating temperature in the other areas outside the window area of the layers which are to be laminated.

For carrying out the process a pressing apparatus with two plates is used; each plate is heated and has an opening with an inserted plug, the temperature of which is lower than the temperature of the plate, and in this apparatus both plates are arranged in axial symmetry and the layers which are to be laminated can be inserted between them.

By this invention excellent laminations of the security features in the identity card can be obtained with no influence on their information content and without any destruction of the films in the window area of the identity card.

Referring now to the drawings wherein like reference characters designate like parts throughout the several views, the identity card 1 shown in FIGS. 1a and 1b comprises a card core 4 which has a window area 3 or a window hole, in which a security feature 2, for example, a relief grid image, a hologram or a microfilm image, is inserted. The card core 4 is protected on the front and on the rear by outer transparent films 5. The card core 4 is provided with personal data of the cardholder which may include the family and christian name of the cardholder and a reference number as shown in the plan view of FIG. 1a.

It is technically extremely difficult to produce a jump of some 10° C. in temperature over distances in the order of magnitude of 1 mm and to keep it up for a determined period. Two temperature profiles 6 and 7 extending along the line AB in FIG. 1a are represented in FIG. 2. The desired, theoretically obtainable, temperature profile 6 in the window area 3 is represented by an interrupted line and has a rectangular-shaped form in the area of the window. In actuality, the temperature profile 7 occurs because the changes in temperature are not discontinuous. It is desirable that the edges of the temperature graph be as vertical as possible when passing in the window area 3. To obtain this a pressing apparatus with two plates is used as shown in FIG. 3 in which the temperature and the pressure in the window area 3 of the layer which is to be laminated can be lowered in comparison to the temperature and pressure used for lamination in the other areas of the identity card.

The pressing apparatus comprises two plates 8 which have an axial symmetrical arrangement and between which the layers which are to be laminated are inserted. Each plate 8 is heated and has an opening with an inserted plug 9. The layers which are to be laminated to a bond 26 have two core layers 27', 27" which enclose a supporting layer 28. The card core, comprising both core layers and the supporting layer, is covered by an upper protection layer 29 and a lower protection layer 30. The core layers 27' and 27" include window openings 25' and 25", and the supporting layer 28, also has a window opening 25'" which is coincident with the window openings 25', 25".

The upper core layer 27' comprises a diagrammatically indicated relief grid in the window opening 25'. Before the process of lamination the card-bond 26 is inserted in such a way in the pressing apparatus that the plugs 9 of both plates 8 are brought to coincide with the window openings 25' and 25". The plugs 9 consist of a material of good thermal conductivity, such as copper or brass, and include a system of channels 10, one of which is diagrammatically indicated in the respective plug 9. Cooling liquid, compressed air or preferably carbon dioxide gas, is conducted through the channels 10. Thus, it is obtained that the temperature in plug 9 is from 10° to 70° C. lower than in the other areas of plate 8. The respective temperature reduction depends on the thermal conductivity of the plug material as well as the type and quantity of the cooling agent passing through the channels.

The plugs 9 can also be prepared of pressure resistant material of a low thermal conductivity having no cooling channels therein, and instead of this would be removable from the openings of the plates 8. To obtain a sufficient temperature reduction in the area of the openings, the plugs 9 are then removed from the openings of the plates 8 after a determined number of working hours in order to cool off.

The cooled plugs 9 are thermally insulated against the plates 8 by a temperature and pressure resistant filling layer 11. Polyfluoroethylene, such as ® Teflon, of a thickness of from 0.5 to 2 mm may be used for this filling layer. It would also be possible to provide an air gap between plug 9 and plate 8 to aid in the thermal insulation of the plug 9 although this may have the disadvantage that laminating material could flow into this air gap. In the embodiment shown in FIG. 3, the heating of the plates 8 result indirectly by the physical contact of the plate with heating elements in the form of resistance wires 12 which are connected to voltage sources 18. The resistance wires 12 are inserted together with a thermometer probe 13 in the plates 8 in order to measure and control the temperature of the plates. The resistance wires 12 are more closely packed around the plugs 9 than in the other areas of the plates 8. Thus the edge-steepness of the jump in temperature between plugs 9 and plates 8 is especially large, because the plugs 9 are intensively cooled and, in order to compensate the resulting heat loss to the coolant the plates 8 around the plugs 9 are heated to a larger extend than the other areas of plates 8 by the closer packing of the resistance wires 12. The plates 8 are insulated in a suitable manner against the supporting plates 15 of the pressing apparatus by insulating layers 14. A further embodiment of the pressing apparatus is shown in FIG. 4 and comprises plates 8 to which a laminar heating resistance layer 16 acting as heating element is connected in series. The heating resistance layer 16 faces the thermoplastic layers which are to be laminated and which are to be laminated and the resistance layers are also thermally insulated from the plates 8 by an insulating layer 14. Contacts 17 which are linked to a heating voltage source 31, are connected to the heating resistant layer 16. This heating voltage source can be a source which applies pulse-shaped voltages to the heating resistant layer. The rest of the structure of the pressing apparatus corresponds generally to the embodiment shown in FIG. 3 and will therefore not be described again.

Figure 5:
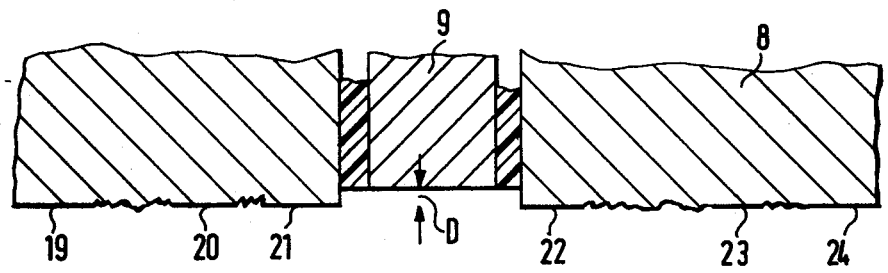
FIG. 5 is an enlarged part-side cross-sectional view of a further embodiment of the present invention.

To obtain the desired pressure reduction in the window openings 25',25" of the card bond 26, ech plug 9 in the window area is recessed a distance D from the surface of plate 8, as it can be seen in FIG. 5. The distance D is within the order of magnitude of 20 $\mu$m to 150 $\mu$m. This pressure-reduction contributes to the fact that the process of laminating the identity card takes place without compressing of the information on the prepared but pressure sensitive relief images.

In the embodiments of FIGS. 3 and 4 the contact surfaces of plate 8 can be textured as it is shown in FIG. 5. In this case, the surfaces of plate 8 comprise smooth areas 19,20,21,22,23,24. After the lamination process the given geometric arrangement of the smooth areas results in corresponding smooth surface areas on the outer thermoplastic films. The relief like texture on the contact surface of plate 8 can be arranged to form a reproducible geometric arrangement which results in corresponding matt areas on the outer thermoplastic film after the lamination process.

It is evident that each continued forming of matt and glossy card-areas in certain geometric arrangements, for example, in the form of heraldic figures, represent a security feature which can be easily controlled, especially if the structure causing the matting comprises structures which are difficult to imitate, for example relief grid structures. Additionally, the plates 8 can be roughened on their surface, so that the laminated cards, with the exception of the clear window area, have a matt surface without disturbing reflection.

With a pressing apparatus according to FIG. 3 in which the plugs 9 were recessed by 50 μm, a 125×90 mm-card of polyvinyl chloride films was lamintated from top to bottom with the following components: a transparent glass-clear film 29 having a thickness of 100 82 m- a matt-whitefilm 27', 140 μm thickness with a security print and an electrophotographically produced card-image—an intermediate layer 28, 80 to 100 μm thickness, as supporting layer of perforated paper—a matt-white film 27" with a thickness of 140 μm and with a security print—and a transparent, glass-clear film 30 with a thickness of 100 μm. The lamination process took place at a laminating temperature of 140° C. and under a laminating pressure of 15 bars (Kp/cm$^2$) for a period of 4 mn. The plug cooling was accomplished with carbon dioxide, which was introduced in the channels 10.

The card had window openings 25', 25" which were brought into congruence with the plugs 9, when being positioned. A grid image of embossed transparent polyvinyl chloride film having a thickness of 80 to 120 μm and a diameter of 1 cm was inserted in the window opening 25'. A disc having a diameter of 1 cm and comprising 60 μm to 160 μm thick transparent polyester film was sutuated in the window opening 25' on the side of the grid image. Intermediate layer 28 and film 27", representing the lower core-layer, contained in the window areas 25'" and 25" two or a single transparent film-inserts, preferably capable of lamination, with a thickness over all of 80 μm to 240 μm. The sum of the combined thicknesses of the inserts in the openings 25', 25" and 25'" is equal to the sum of the thickness of the layers 27',28 and 27". The plugs 9 had also a diameter of 1 cm, whereas the insulating layer 11 had a thickness of 1 mm. After lamnination the intact grid image extended in a circular area of approximately 9 mm diameter in the window openings 25" of the card bond 26. The specified higher values of the thickness-ranges of the inserts are top boundary values.

Although the invention has been described relative to specific embodiments thereof, it is not so limited and many modifications and variations thereof will be readily apparent to those skilled in the art in light of the above teachings. It is therefore, to be understood that, within the scope of the appended claims, the invention may be practiced otherwise than as specifically described.

The embodiments of the invention in which an exclusive property or privilege is claimed are defined as follows:

What is claimed is:

1. A process for the selective lamination by means of heat and pressure of at least internal surfaces of two thermoplastic layers, at least one of said layers including therein at least one window portion in which at least one insert is located, said lamination ocurring without laminating at least one window portion of said layers, said process comprising the steps of:
   aligning said at least two thermoplastic layers along said window portions;
   discontinuously pressing said at least two thermoplastic layers together, said discontinuous pressing occurring at the window portions of said layers and the pressure thereon being less than the pressure applied to the rest of the surface of said layers; and
   heating the external surfaces of said thermoplastic layers in a discontinuous manner across each of said external surfaces, said discontinuous heating occurring at each of said selected window portions of said layers with said temperature at said window portion being at least 10° C. lower than at the rest of the external surfaces of said layers, wherein said discontinuous heating step includes the steps of:
   heating an area immediately adjacent said selected window portion to a temperature higher than the temperature of the rest of the surfaces of said layers; and
   cooling said selected window portion to a temperature which is from 10° to 70° C. below the rest of the external surfaces of said layers.

2. A process according to claim 3, wherein said heating step includes the step of providing said selected window portions of said layers with a smooth external surface and the rest of said external surfaces of said layers with a matt area.

3. A process according to claim 3, wherein said heating step includes providing said selected window portions of said external surfaces of said layers with smooth areas and providing the rest of said external surfaces of said layers with combinations of smooth and matt areas having a given geometric shape.

4. A process according to claim 3, wherein there are at least three layers, one of which is a core layer and two of which are external layers, said core layer having an aperture therein, wherein said aligning step includes the steps of:
   aligning one external layer and said core layer;
   providing a film insert capable of lamination in said aperture;
   embossing grid images on said insert;
   providing a protective insert not capable of lamination over said embossed insert; and
   aligning said one of said two external layers and said core with said other of said external layers covering said protective insert.

* * * * *

UNITED STATES PATENT AND TRADEMARK OFFICE
CERTIFICATE OF CORRECTION

PATENT NO. : 4,441,945
DATED : April 10, 1984
INVENTOR(S) : Roland MORAW and Renate SCHAEDLICH It is certified that error appears in the above—identified patent and that said Letters Patent is hereby corrected as shown below:

Claim 2, column 6, line 39, kindly delete "3" and insert instead -- 1 --.

Claim 3, column 6, line 44, kindly delete "3" and insert instead -- 1 --.

Claim 4, column 6, line 50, kindly delete "claim 3" and insert instead -- Claims 1, 2 or 3 --.

Signed and Sealed this

Twentieth Day of November 1984

[SEAL]

Attest:

Attesting Officer

GERALD J. MOSSINGHOFF

Commissioner of Patents and Trademarks